（12）United States Patent
Laasik et al.

(10) Patent No.: US 9,419,847 B2
(45) Date of Patent: Aug. 16, 2016

(54) NOTIFICATION OF COMMUNICATION EVENTS (71) Applicant: Microsoft Technology Licensing, LLC, Redmond, WA (US)

(72) Inventors: Marek Laasik, Tallinn (EE); Mihails Velenko, Riga (LV); Sergei Zolotarjov, Tallinn (EE); Carl Stefke Olivier, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 13/774,792

(22) Filed: Feb. 22, 2013

(65) Prior Publication Data

US 2013/0336309 A1 Dec. 19, 2013

(30) Foreign Application Priority Data

Jun. 14, 2012 (GB) .................................. 1210598.7

(51) Int. Cl.
*H04L 12/66* (2006.01)
*H04L 29/06* (2006.01)
*H04M 3/42* (2006.01)
*H04M 7/00* (2006.01)

(52) U.S. Cl.
CPC ..... *H04L 29/06183* (2013.01); *H04M 3/42042* (2013.01); *H04M 3/42059* (2013.01); *H04M 3/42102* (2013.01); *H04M 7/006* (2013.01); *H04M 2203/2061* (2013.01); *H04M 2203/652* (2013.01)

(58) Field of Classification Search
None
See application file for complete search history.

(56) References Cited

U.S. PATENT DOCUMENTS

| 6,952,411 | B2 | 10/2005 | Sinnarajah |
| 7,385,992 | B1 | 6/2008 | Koch et al. |
| 7,418,090 | B2 * | 8/2008 | Reding et al. ............ 379/202.01 |
| 7,660,850 | B2 | 2/2010 | Tidwell et al. |
| 7,752,253 | B2 | 7/2010 | Manion |
| 7,965,828 | B2 | 6/2011 | Calahan et al. |

(Continued)

FOREIGN PATENT DOCUMENTS

| CN | 1197567 | 10/1998 |
| CN | 101047602 | 10/2007 |

(Continued)

OTHER PUBLICATIONS

"Developing a SAP Application", Retrieved on: Jun. 5, 2012, Available at: http://www.samsungdforum.com/upload_files/files/guide/data/html/html_2/javascript/push/js_sap_development.html, 4 pages.

(Continued)

*Primary Examiner* — Jae Y Lee
*Assistant Examiner* — Thinh Tran
(74) *Attorney, Agent, or Firm* — Tom Wong; Micky Minhas (57) ABSTRACT An apparatus, computer program product and method, the apparatus comprising: processing apparatus configured to generate a push notification relating to a communication from an originating endpoint intended for a destination endpoint, the communication to be conducted over a packet-based network; and transceiver apparatus arranged to send the push notification to the destination endpoint. The processing apparatus is configured to generate the push notification with a payload comprising an indication of a language to be used by the destination endpoint to output a user notification notifying a destination user regarding the communication.

20 Claims, 3 Drawing Sheets

(56) References Cited

U.S. PATENT DOCUMENTS

| | | | |
|---|---|---|---|
| 8,081,958 B2 | 12/2011 | Soderstrom | |
| 8,176,176 B1 | 5/2012 | Chan | |
| 9,059,880 B2 | 6/2015 | Laasik et al. | |
| 9,060,049 B2 | 6/2015 | Laasik et al. | |
| 9,282,192 B2 | 3/2016 | Laasik et al. | |
| 2002/0034166 A1* | 3/2002 | Barany et al. | 370/329 |
| 2002/0132638 A1 | 9/2002 | Plahte et al. | |
| 2005/0015495 A1 | 1/2005 | Florkey et al. | |
| 2005/0084078 A1 | 4/2005 | Miller et al. | |
| 2005/0169285 A1 | 8/2005 | Wills et al. | |
| 2006/0182245 A1 | 8/2006 | Steinmetz | |
| 2007/0133771 A1 | 6/2007 | Stifelman et al. | |
| 2007/0140448 A1 | 6/2007 | Lin et al. | |
| 2008/0028097 A1 | 1/2008 | Makela | |
| 2009/0182549 A1* | 7/2009 | Anisimovich | G06F 17/2755 704/4 |
| 2009/0187398 A1* | 7/2009 | Wrobel | 704/8 |
| 2009/0248421 A1 | 10/2009 | Michaelis et al. | |
| 2010/0279662 A1 | 11/2010 | Kuusinen et al. | |
| 2010/0325194 A1 | 12/2010 | Williamson et al. | |
| 2011/0029598 A1 | 2/2011 | Arnold et al. | |
| 2011/0151944 A1 | 6/2011 | Morgan | |
| 2011/0158396 A1 | 6/2011 | Eichen et al. | |
| 2011/0202588 A1 | 8/2011 | Aggarwal | |
| 2011/0252079 A1 | 10/2011 | Werner et al. | |
| 2011/0252145 A1 | 10/2011 | Lampell et al. | |
| 2011/0252146 A1 | 10/2011 | Santamaria et al. | |
| 2011/0268263 A1 | 11/2011 | Jones et al. | |
| 2011/0271197 A1 | 11/2011 | Jones et al. | |
| 2012/0050455 A1 | 3/2012 | Santamaria et al. | |
| 2012/0117250 A1 | 5/2012 | Santamaria | |
| 2012/0134349 A1 | 5/2012 | Jung et al. | |
| 2012/0220263 A1 | 8/2012 | Smith et al. | |
| 2012/0299751 A1 | 11/2012 | Verna et al. | |
| 2012/0303834 A1 | 11/2012 | Adam et al. | |
| 2012/0311329 A1 | 12/2012 | Medina et al. | |
| 2013/0165185 A1* | 6/2013 | Guo et al. | 455/566 |
| 2013/0190032 A1* | 7/2013 | Li | 455/517 |
| 2013/0290058 A1 | 10/2013 | Gray et al. | |
| 2013/0311096 A1 | 11/2013 | Greer et al. | |
| 2013/0336308 A1 | 12/2013 | Laasik | |
| 2013/0336310 A1 | 12/2013 | Laasik | |
| 2013/0336311 A1 | 12/2013 | Laasik | |
| 2014/0003320 A1 | 1/2014 | Etemad et al. | |
| 2015/0326731 A1 | 11/2015 | Laasik et al. | |
| 2016/0156677 A1 | 6/2016 | Laasik et al. | |

FOREIGN PATENT DOCUMENTS

| | | |
|---|---|---|
| CN | 101170422 | 4/2008 |
| CN | 101273594 | 9/2008 |
| CN | 101299785 | 11/2008 |
| CN | 101584202 | 11/2009 |
| EP | 1014653 | 6/2000 |
| EP | 1517813 | 12/2003 |
| EP | 1571813 | 9/2005 |
| EP | 1308058 | 1/2008 |
| EP | 2107775 | 10/2009 |
| GB | 2384390 | 7/2003 |
| GB | 2504461 | 2/2014 |
| WO | WO 2012094253 | 7/2012 |

OTHER PUBLICATIONS

"Scheduling, Registering, and Handling Notifications", Retrieved on: Jun. 5, 2012, Available at: http://developer.apple.com/library/ios/#DOCUMENTATION/NetworkingInternet/Conceptual/RemoteNotificationsPG/IPhoneOSClientImp/IPhoneOSClientImp.html, 12 pages.

Arbuthnot, Tom "New Lync PowerShell Cmdlets in CU4 for Managing Mobility", Retrieved on: Jun. 4, 2012, Available at: http://lyncdup.com/2011/11/new-lync-powershell-cmdlets-in-cu4-for-manaqing-mobility/, 9 pages.

Greenlee, Michael "Forking SIP requests in an MSPL script", Retrieved from: http://blog.greenl.ee/2012/01/17/forking-sip-requests-mspl-script/, (Jan. 17, 2012), 5 pages.

"International Search Report and Written Opinion", Application No. PCT/US2013/044393, Jun. 25, 2014, 14 pages.

"Final Office Action", U.S. Appl. No. 13/655,013, May 7, 2014, 18 pages.

"International Search Report and Written Opinion", Application No. PCT/US2013/044623, (Aug. 13, 2013), 8 pages.

"International Search Report and Written Opinion", Application No. PCT/US2013/044867, (Oct. 1, 2013), 11 Pages.

"International Search Report and Written Opinion", Application No. PCT/US2013/044868, (Oct. 1, 2013), 11 Pages.

"Non-Final Office Action", U.S. Appl. No. 13/655,013, (Oct. 25, 2013), 16 pages.

Rosenberg, J. et al., "Session Initiation Protocol (SIP) Caller Preference and Callee Capabilities", (Nov. 1, 2002), 47 Pages.

"Combined Search and Examination Report", GB Application No. 1210599.5, Nov. 26, 2013, 5 pages.

"Non-Final Office Action", U.S. Appl. No. 13/775,051, Aug. 21, 2014, 16 pages.

"Non-Final Office Action", U.S. Appl. No. 13/775,075, Aug. 22, 2014, 16 pages.

"Notice of Allowance", U.S. Appl. No. 13/775,075, Feb. 2, 2015, 9 pages.

Crockford, "The application/json Media Type for JavaScript Object Notation (JSON)", Network Working Group, Jul. 2006, 10 pages.

"Foreign Office Action", CN Application No. 201310235124.3, Oct. 27, 2015, 13 pages.

"Foreign Office Action", CN Application No. 201310236144.2, Nov. 3, 2015, 17 pages.

"Foreign Notice of Allowance", EP Application No. 13730756.7, Dec. 23, 2015, 8 pages.

"Non-Final Office Action", U.S. Appl. No. 13/655,013, Feb. 24, 2015, 16 pages.

"Notice of Allowance", U.S. Appl. No. 13/775,051, Feb. 11, 2015, 9 pages.

"Final Office Action", U.S. Appl. No. 13/655,013, Aug. 11, 2015, 18 pages.

"Corrected Notice of Allowance", U.S. Appl. No. 14/715,319, Nov. 24, 2015, 2 pages.

"Foreign Office Action", CN Application No. 201310236142.3, Sep. 17, 2015, 11 pages.

"Foreign Office Action", CN Application No. 201310236190.2, Sep. 6, 2015, 18 pages.

"Notice of Allowance", U.S. Appl. No. 14/715,319, Oct. 16, 2015, 8 pages.

"Non-Final Office Action", U.S. Appl. No. 13/655,013, Feb. 25, 2016, 17 pages.

"Corrected Notice of Allowance", U.S. Appl. No. 14/715,319, Feb. 4, 2016, 2 pages.

"Foreign Office Action", CN Application No. 201310236190.2, Apr. 21, 2016, 12 pages.

"Foreign Office Action", CN Application No. 201310236144.2, May 24, 2016, 5 pages.

"Foreign Office Action", CN Application No. 201310236142.3, Apr. 20, 2016, 6 pages.

* cited by examiner

NOTIFICATION OF COMMUNICATION EVENTS

RELATED APPLICATION

This application claims priority under 35 USC 119 or 365 to Great Britain Application No. 1210598.7 filed Jun. 14, 2012, the disclosure of which is incorporated in its entirety.

BACKGROUND

Various communication systems exist for establishing a live, packet-based voice or video call over a packet-based network such as the Internet. For example such systems may use VoIP (voice-over internet protocol) technology. One popular type of communication system is built on a peer-to-peer (P2P) topology. In a traditional P2P system, each end-user installs a communication client application on his or her respective user terminal (e.g. desktop or laptop computer, tablet or handheld mobile phone). Each user then registers with a server of the P2P provider to obtain an authentication certificate. Some of the users' terminals will also become nodes of a distributed database mapping usernames of the users within the P2P communication system to addresses of the various user terminals within the network over which the system is implemented (typically IP addresses). Communications between end-users can then proceed without the involvement of a centralized server in the call set-up or authentication process. Instead, the client on the terminal of a caller queries one or more nodes of the distributed database (i.e. one or more terminals of other end-users, not necessarily themselves in any other way involved in the call) in order to determine the address of the intended callee's terminal. The caller then uses the determined address to send a call invite to the callee, and the callee responds with a call acceptance response. The caller and callee exchange their authentication certificates in order to authenticate one another.

Each user also maintains a contact list, which may be stored on a server of the P2P provider so that it is available even if the user logs on to a different terminal. Other secondary information such as profile information for each user (e.g. an avatar image or mood message) may also be stored on a server. Further, the client applications also exchange presence information with one another. The presence information indicates an availability status of the user, and is defined at least in part by the user him- or herself. For example the presence may indicate whether the user is offline, online but has selected not to be available ("do not disturb"), or online and selected to be available. For example each client may periodically poll each of the contacts in its contact list to determine their respective presence, and/or each client may periodically send out presence updates to each of the contacts in its list. The presence is typically signalled directly between end user's based on the P2P technique, rather than via a server. When making a call, the caller's client determines whether the callee is available to accept the call based on the most up-to-date presence information.

SUMMARY

Embodiments of the present invention provide an apparatus comprising processing apparatus and transceiver apparatus. The processing apparatus is configured to generate a push notification relating to a communication from an originating endpoint intended for a destination endpoint, the communication to be conducted over a packet-based network. The transceiver apparatus is arranged to send the push notification to the destination endpoint. Further, the processing apparatus is configured to generate the push notification with a payload comprising an indication of a language to be used by the destination endpoint to output a user notification notifying a destination user regarding the communication.

According to further embodiments of the present invention, there are provided a corresponding method and computer program product.

This Summary is provided to introduce a selection of concepts in a simplified form that are further described below in the Detailed Description section. This Summary is not intended to identify key features or essential features of the claimed subject matter, nor is it intended to limit the claimed subject matter. Nor is the claimed subject matter limited to implementations that solve any or all of the noted disadvantages of prior systems.

DETAILED DESCRIPTION

With the increasing prevalence of handheld mobile phones able to run communication client applications such as VoIP clients, there are an increasing number of endpoints available for involvement in a VoIP communication system or other such packet-based communication system implemented over the Internet or the like. However, an issue that may also arise is that the mobile phone handset typically has more limited resources than a traditional desktop or laptop computer, for example being able to perform fewer processing cycles per unit time, having less functionality per processing cycle, having more limited memory resources (e.g. RAM and/or cache) and/or having less screen area resource. Accordingly, the operating system (OS) on some terminals may place certain applications into a background state. This could include the communication client. In the background state, the backgrounded application may either be totally suspended or be scheduled limited processing cycles per unit time to an extent that it is unable to detect incoming call invites and/or process a traditional call invite. For example, this could occur if another application is being run in a foreground state, especially if the other application is intensive in terms of processing, memory and/or screen resources, e.g. running in a full screen mode or currently having some other status as a dominant application. One example would be a computer game played on the mobile phone. In such cases the user may appear from his or her presence to be offline if the client is unable to send out presence updates or respond to presence polling from other users. Nonetheless, the user may still wish to be available to take a call, e.g. would prefer to interrupt the video game than miss the call. Hence the traditional concept of presence starts to break down. A similar issue could potentially arise on any terminal that has the feature of being able to place certain applications into a background state in favour of one or more other applications. Hence it may be desirable to move away from a P2P approach for call set up, or at least away from a purely P2P approach.

Another issue that can arise with communication systems such as conventional P2P systems implemented over packet-based networks is the speed of call signalling, particularly how long it takes before the call is answered, or how long it takes to determine that the call is not answered. This may particularly (but not exclusively) a problem when the callee's client is in a background state as discussed above, where the caller may have to wait for the attempted call invite to time out before he or she is informed that the callee is not available. Call signalling delays may also occur in other situations and in other types of communication system.

It may therefore be desirable to provide an improved or alternative way of notifying a destination user terminal of a call or other communication event.

Some other types of communication systems use push notifications to notify a destination user terminal of a communication event. A push notification is a notification sent from server at the instigation of the server or another originating element, rather than at the instigation of the destination terminal itself (i.e. as opposed to being pulled by the destination terminal). Hence the push notification may be considered asynchronous with the destination terminal. For example, conventionally such push notifications may be used to indicate availability of an IM (instant messaging) chat message or file transfer at a server, originating from an originating user terminal.

However, a "raw" push notification only notifies the destination terminal that there is some sort of communication waiting for it at the server. The destination terminal still then has to poll the server to determine the nature of the waiting communication, i.e. to determine the nature of the event of which it is being notified, and to pull the relevant information concerning the nature of the event from the server in response to receiving the push notification. This means once the destination terminal has received the notification then it still has to refer back to the server to obtain information allowing the destination user to make an informed decision about whether he or she wishes to obtain the communication (before then going back again to fetch the waiting communication if so, e.g. to fetch the waiting IM chat message or file transfer).

If for example such a system of push notifications was directly adapted to notify users of call invites, such that a raw notification was used to wake up a destination client application from a background state, then upon wake up the destination client would then have to poll the server in order to discover why it had been woken up (i.e. to determine that a call is proposed) and to discover an identity of the caller or the originating terminal enabling it to respond to the call invite. This may introduce an undesirable delay into the call signalling.

Further, the nature of the information retrieved may still be of limited use, and not necessarily tailored to the particular intended recipient of the communication, or the particular sender of the communication, or combination of sender and recipient.

According to embodiments of the present invention there is provided an augmented push notification mechanism, in which the push notification comprises a payload carrying information enabling the destination user to make an informed decision as to whether to accept the call or communication. Particularly, the payload information comprises at least an indication of a language to use to notify the destination user of the relevant communication event (e.g. incoming call). The language may be a language of the originating user (the caller in the case of a call), the destination user (the callee in the case of a call), or a language shared by both the originating user and the destination user.

In embodiments the payload information of the push notification comprises a language template, comprising the indication of the language to use and an indication of a linguistic syntax for formulating an on-screen or audible notification to the destination user.

The payload may optionally comprise other information such as an indication of the type of the communication (e.g. call, IM, voicemail, file transfer); an indication of the originating user (e.g. username and/or display name); an avatar image representing the originating user (or a link to the avatar image); an address of the originating terminal; an indication of a type of the originating terminal; an encryption key of the originating user; a timestamp; a session identifier of a proposed communication session (e.g. a call ID of a proposed call); a conversation identifier for the communication; and or an indication of any relays to use for the communication.

In embodiments, because additional user information is provided in the push notification itself, at the time of the notification, the receiving user is better able to determine whether he or she wishes to accept the associated communication or communication session (e.g. a proposed call) without necessarily having to first fetch additional information from a network element of a communication provider to determine the nature of the incoming communication and/or the identity of the sender. This advantageously reduces the number of roundtrips and therefore the signalling delay.

As mentioned, modern mobile devices such as handheld mobile phones are now able to run communication client applications for performing packet-based communications such as VoIP or other packet-based voice or video calls over a packet-based network such as the Internet, rather than just via a dedicated cellular voice channel of the mobile phone. With this ability comes a drastic increase in the number of users who will be online and callable or contactable. However, the client applications of such users may also potentially be found in a background state at the time of calling, whereby the client is suspended or at best scheduled very limited resources by the mobile device's operating system—thus needing to be woken up in order to receive incoming calls.

Under such an operating system regime—where applications can no longer guarantee being able to process events such as incoming calls, chats, etc. in the background—the VoIP or other communication provider's architecture would benefit from being extended. For example, this will be beneficial if the provider wishes to be able to deliver call (and other) notifications to users of their communication system even though the users may have "backgrounded" the relevant communication client application (or had the application backgrounded by the operating system) but who are nonetheless still online and as such potentially callable or contactable. The client applications' calling components may also be modified to ensure the initial intention to call a user can be reliably delivered to all endpoints where the user should be able to receive a call (or other communication)—via a push notification if needed.

For example, consider a use case in which a callee is using a web-browser or playing a video game on a handheld phone or tablet while waiting for his or her friend to call (perhaps from a foreign country so preferring to use VoIP for cost reasons). The callee checked whether the friend was online based on presence status but when he or she was not the callee began browsing or playing to fill time. The friend (the caller) then subsequently logs on to his or her client application, e.g. on a desktop computer, ready to call the callee. In embodiments, the callee's client may be modified to show the callee as online to the caller even though the callee's client application has been suspended or supressed by the callee's operating system due to the high system resources the browser or game needs to consume, e.g. due to a flash application or other applet running in the browser. In embodiments of the invention, the caller clicks the call button to initiate a call with the callee, and the callee's operating system is configured to bring up a prompt notifying him or her of the incoming call. The callee's client application is configured such that, if the callee hits or clicks the accept button in response to the prompt then the client application is brought back into the foreground on the callee's terminal, thus allowing the callee to answer the call (voice or video) and start talking with his or friend the caller.

There are some elements to note in this exemplary scenario. The state of the callee client is at worst potentially totally suspended (terminated), and as such would not be reached by conventional P2P session establishment methods. In embodiments of the invention, the callee may not be aware of or notice that his or her client application was suspended, as this may not have been done explicitly by the callee user— in fact quite the opposite, this may have been done automatically by the operating system and the callee may be under the assumption that his or her client application is still running, and that they are online and reachable. Further, in this scenario, presence is not made dependent (or not only dependent) on the P2P availability of the client, unlike a conventional presence mechanism for such systems.

In order to support the above scenario, the provider will implement new calling components and/or make the necessary changes to existing components.

One goal is to get callee clients woken up and able to establish a session with the caller client (e.g. a P2P session) in a suitable timeframe and scope. In order to keep call set-up time as short as possible, roundtrips in session and call establishment should be kept to a minimum wherever possible.

As demonstrated in the example scenario above, the calling initiation flow may support a use case of needing to signal the intent of a call via a non-P2P message delivery system which can fall back to push notifications where needed in order to wake the callee client up. For example, this could be via a push notification service provided by the provider of the operating system in question The calling components may be updated to implement the necessary client component changes, e.g. in core libraries to ensure they cater for all required use cases, interoperability and backward compatibility scenarios.

The calling client components may be updated to allow callee clients to accept incoming call invites received via push notification delivery methods. This may include a set of one or more UI (user interface) APIs (application programming interfaces) allowing the client UI layer to pass the received payload information to the calling components, enabling P2P session establishment and call set-up and signalling to proceed.

For call related information to be included in the payload of the message which is delivered to the callee endpoint(s) via the message delivery system, the calling functionality may support cloud based services, which receive the message from the delivery infrastructure and populate this will calling specific payload information.

The call notification will include enough information to allow the callee to make an informed decision on whether to answer the call or not. This may include for example caller name (username and/or display name), an avatar of the caller, and/or a timestamp of the call invite. The call notification may also include information allowing the callee client to formulate an acceptance response, such as a handshake message and information enabling the caller to be contacted in response (e.g. caller username and/or address).

Once the call notifier of the delivery system has completed the above, the call notification is passed for final delivery to the callee endpoint(s). This will happen where the user being invited to a call has registered for receiving push notifications, or where an open connection exists to the client. The notification may be over a direct persistent connection (callee client in foreground, and/or some background states) or via push notification to the relevant operating system based notification service where required (callee client suspended, and/ or some other background states).

The invite to participate in a call may be issued by a calling party in a number of cases, such as: before the actual call is established, being part of the initiation; or during an ongoing call to add another participant to the call.

Figure 1:
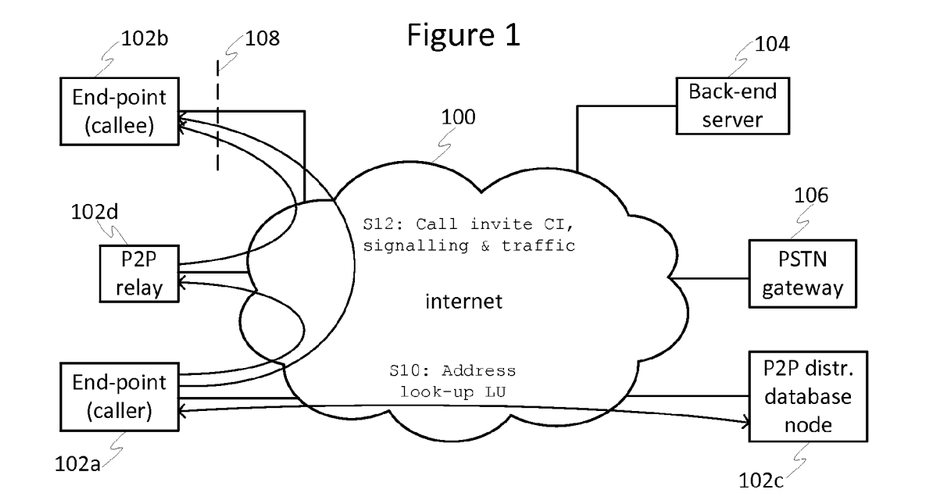
FIG. 1 is a schematic diagram of a communication system.

FIG. 1 is a schematic illustration of a communication system based on a traditional P2P paradigm. The communication system comprises a packet-based network 100, e.g., a wide-area internetwork (internet) such as the Internet. The communication system also comprises a plurality of end-user terminals 102 each comprising transceiver apparatus operable to couple to the Internet 100, and each comprising a respective communication client application of the communication system in question. Each of the end-user terminals 102 may for example take the form of a desktop or laptop computer, tablet or handheld mobile phone (or "handset"). Each of the user terminals 102 is a potential endpoint of a VoIP call or other packet-based communication within the communication system. Illustrated in FIG. 1 is a caller endpoint 102a and a callee endpoint 102b.

In accordance with conventional P2P principles, the client application on one or more of the user terminals 102c takes on the status of a node of a distributed address look-up database. In order to determine the address (e.g. comprising the IP address) of the callee's user terminal 102b, at step S10 the client on the caller's user terminal 102a communicates, via the Internet 100, with the client on one of the user terminals 102c acting as a node of the distributed database. The client on the caller's terminal 102a queries the database node 102c by sending it the callee's username identifying the callee within the communcation system, and the database node 102c returns the required address of the callee's user terminal 102b. At step S12 the client on the calling user terminal 102a then uses this address to signal a call set-up request or "invite" (CI) to the client on the intended callee's terminal 102b. In response, if the callee chooses to accept the call, the client on the callee terminal 102b signals back a call acceptance response. The clients on the caller's and callee's terminals 102a and 102b also exchange authentication certificates to verify one another's identify. The clients thus establish a session between one another in order to send traffic in the form of real-time voice and/or video content from microphones and/or video cameras on their respective terminals 102, 102b as part of a live voice or video call. Because the address look-up is based on a distributed database, it does not need to involve a central server for this purpose. The call set-up signalling, authentication and call traffic also proceed without the need for a central server to be involved.

In embodiments, if the caller's user terminal 102a is unable to communicate directly with the callee's user terminal 102b due to an NAT (network address translation) or firewall 108, the clients may be arranged to communicate via one or more relays which may also be implemented by clients running on end-user terminals 102d of one or more other users of the P2P communication system. The user of the relaying end-user terminal 102d need not be a participant of the call (need not consume the voice or video content of the call, and indeed not be able to due to encryption). Nonetheless, the user of the relaying end-user terminal 102d will have agreed to such a situation when he or she signed up to the P2P communication system, and may him- or herself benefit from a reciprocal arrangement on other occasions.

The communication system may further comprise a back-end server 104 coupled to the Internet 100, where each of the clients may store a respective contact list being a list of the contacts of its respective user (the communication system is configured such that users become contacts of one on upon mutual agreement). The back-end server 104 may also store profile information for each of the users, e.g. an avatar image for representing the respective user to other users within the communication system. Each client may access and display the profile of a contact so that a caller can see the profile information of a callee and vice versa.

The communication system may also comprise a gateway 106 coupled between the Internet 100 and a circuit-switched network (not shown). Such a network may be referred to as a PSTN (public switched telephone network), e.g. a landline network or mobile cellular network such as a 3GPP network. A client on a user terminal 102 is thereby also able to establish calls with more traditional telephones via the gateway 106.

Figure 2:
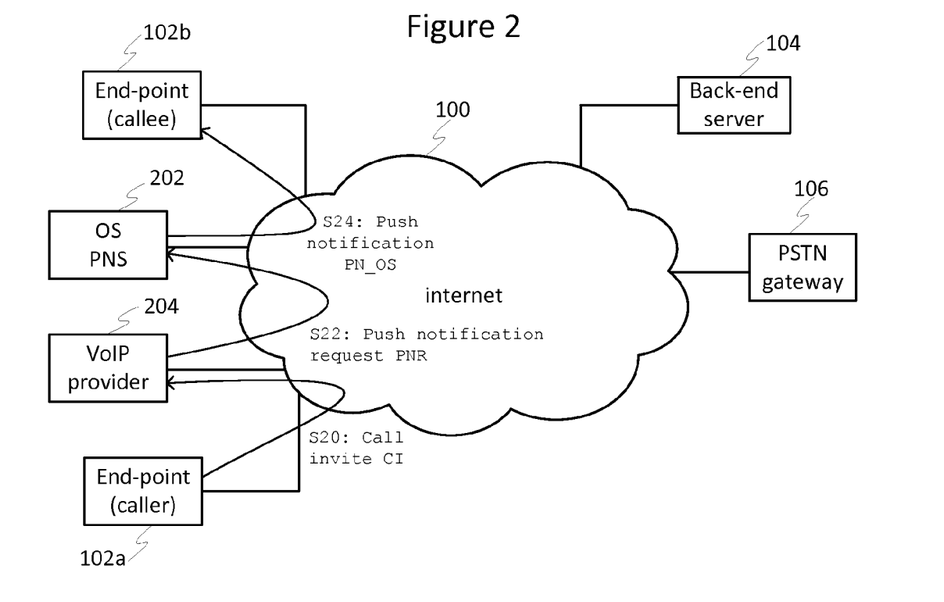
FIG. 2 is another schematic diagram of a communication system.

FIG. 2 illustrates a modified, hybrid P2P communication system in accordance with embodiments of the present invention. Some or all of the components of FIG. 1 may also still be present in parallel with the system of FIG. 2, but some are omitted from FIG. 2 for conciseness. Further, the communication system comprises a network element 204 of a communication service provider, e.g. VoIP provider, in the form of one or more server units coupled to the Internet 100 and arranged to run call control and notification software. The communication system also comprises one or more operating system based push notification services (OS PNS) 202 coupled to the Internet 100. Each of the one or more operating system based push notification services 202 is associated with a respective operating system, and is provided by the maker and/or publisher of the operating system to support a dedicated push notification mechanism available via the operating system in question. The operating system based push notification service 202 takes the form of one or more server units arranged to run push notification software.

In the exemplary system of FIG. 2, the illustrated elements 102, 202, 204 are configured to operate as follows. At step S20, the client on the caller's user terminal 102a sends a call invite (CI) not directly to the client on the callee's user terminal 102b, but to the call control and notification element 204 of the VoIP provider (the message CI is not necessarily identical to that described in relation to FIG. 1). In response to receiving the call invite from the caller, at step S22 the call control and notification element 204 of the VoIP provider generates a push notification request (PNR) which it sends to the operating system based push notification service 202. In response to receiving the push notification request from the VoIP provider 204, at step S24 the OS's push notification service 202 sends an operating system based push notification (PN_OS) to the operating system on the callee's user terminal 102b. The operating system based push notification is received and processed by the operating system on the callee's user terminal 102b, causing it to show a pop-up message on the screen of the callee's user terminal 102b indicating to the callee user that there is an incoming event.

In embodiments of the present invention, the on-screen message may prompt the callee as to whether to accept the incoming call. If the callee's client application is currently backgrounded, the on-screen message may prompt the user as to whether to wake up the callee's client application from the background state. In embodiments these actions may be combined into the same prompt. If in response the callee provides a user input in the affirmative, the operating system wakes up the callee client application on the callee's terminal 102 by re-scheduling to a full level of operation or at least scheduling it sufficient resources to handle the call.

As discussed in more detail below, in embodiments the push notification PN_OS may comprise a payload enabling the client on the callee's user terminal 102b to formulate a return handshake message and signal that message back to the client on the caller's user terminal 102a over the Internet 100, directly over the Internet 100 rather than via the servers of any of the provider or service elements 202 and 204. If the callee accepts the user prompt from the operating system, the operating system on the callee's user terminal 102b passes at least part of the payload of the push notification up to the callee's client application in order that it may formulate and send back the relevant response to the caller.

Figure 3:
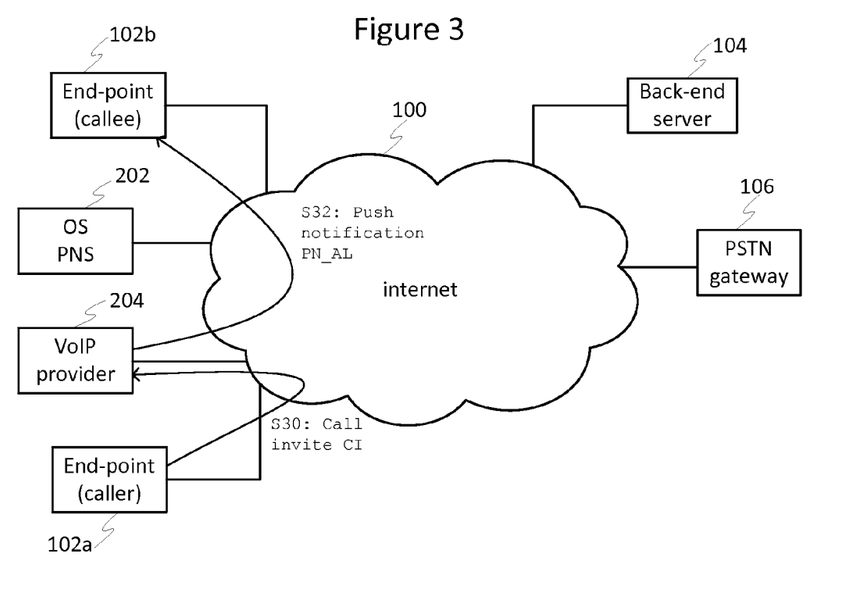
FIG. 3 is another schematic diagram of a communication system.

FIG. 3 illustrates another modified, hybrid P2P communication system in accordance with embodiments of the present invention. Some or all the components of FIGS. 1 and/or 2 may also still be present in parallel with the system of FIG. 3, but some are omitted from FIG. 3 for conciseness.

In the exemplary system of FIG. 3, the illustrated elements 102, 204 are configured to operate as follows. At step S20, the client on the caller's user terminal 102a again sends a call invite (CI) not directly to the client on the callee's user terminal 102b, but to the call control and notification element 204 of the VoIP provider (the message CI is not necessarily identical to that described in relation to FIG. 1). In embodiments this could be the same step as that described in relation to FIG. 2, or in other embodiments it could be an alternative or an additional, separate step. However, in this case, the VoIP provider element 204 does not send (or does not only send) a push notification request (PNR) to the operating system's push notification service 202. Rather, it directly formulates its own application layer push notification (PN_AL) which it sends directly over the Internet 100 to the client on the callee's user terminal 102b. The client on the callee's use terminal 102b may then process the notification at the application layer in order to itself prompt the callee user regarding the incoming call by means of an application layer mechanism, rather than the operating system mechanism described above.

As discussed in more detail below, in embodiments the push notification PN_AL comprises a payload enabling the client on the callee's user terminal 102b to formulate a return handshake message and signal that message back to the client on the caller's user terminal 102a over the Internet 100, directly over the Internet 100 rather than via the servers of any of the provider or service elements 202 and 204. In this case, if the client on the callee's terminal 102b is either in a foreground state (not suppressed in favour of any other applications) or is in a special background state whereby it is scheduled limited cycles but still enough to process an incoming call, then the callee's client is able to directly access the payload of the push notification by listening for incoming communications from the network 100 during the time the callee's client is scheduled by the operating system, e.g. listening on a network socket of the callee's terminal 102b allocated for use by the callee's client.

Note that two or more of the mechanisms of FIGS. 1, 2 and 3 may be present in parallel, and any or all of these may be available for signalling call invitations or notifications.

In one embodiment of the present invention, at least the callee endpoint 102b comprises a mobile terminal having relatively limited resources (processing, memory and/or screen resources), and having an operating system liable to background the respective client application in favour of another application such as a video game in certain circumstances. In the case where the client application is totally suspended, this means it is terminated until woken up and may need to cold start in order to receive a call or other communication.

Figure 4:
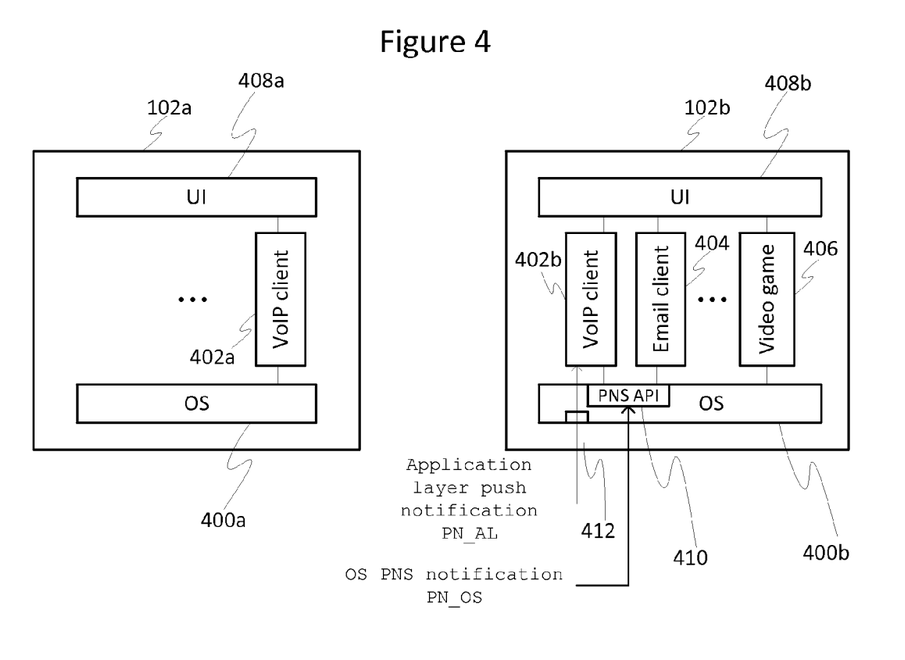
FIG. 4 is a schematic diagram of two user terminals.

FIG. 4 gives a schematic block diagram of the originating end-user terminal 102a of the calling user (caller) and the destination end-user terminal 102b of the called user (callee), which form the two end-points of the call (or even two of a greater number of endpoints in a multi-party conference call scenario).

The originating user terminal 102a comprises a respective operating system 400a, communication client 402a of the VoIP communication system (as well as potentially other applications), and user interface 408a. The VoIP client 402a is stored on a memory of the originating terminal 102a (in the form of a computer-readable storage memory or media such as an electronic or magnetic storage device) and arranged for execution on a processing apparatus of the originating terminal 102a. The term "computer readable storage memory" is intended to cover all statutory forms of storage media and hence, is not intended to cover non-statutory forms of media such as signals and carrier waves.

The client application 402a is also said to be run on the operating system 400a, in that it is scheduled for execution by the operating system 400a. If there are multiple applications present and running on the terminal 102a, the operating system will schedule them for execution, e.g. in an interleaved fashion and/or on parallel processing resources so that each is allocated at least some processing resources under control of the operating system 400a. When scheduled the client application 402a is able to interact with the user via the user interface 408a and to communicate over the network 100 via a transceiver apparatus of the user terminal 102a. As will be discussed in more detail in relation to the destination terminal 102b, the operating system may also suspend execution of an application such as the client application.

The destination user terminal 102b also comprises a respective operating system 400b, communication client 402b of the VoIP communication system, other applications such as an email client 404 and video game 406, and a user interface 408b. The communication client 402b is stored on a memory of the destination terminal 102b (in the form of a computer-readable storage memory or media such as an electronic or magnetic storage device) and arranged for execution on a processing apparatus of the destination terminal 102b. The VoIP client application 402b and other applications 404, 406 are said to be run on the operating system 400b in that they are scheduled for execution by the operating system e.g. in an interleaved fashion and/or on parallel processing resources so that each is allocated at least some processing resources under control of the operating system 400b. When scheduled the VoIP client 402b is able to interact with the user via the user interface 408b and to communicate over the network 100 via a transceiver apparatus of the destination user terminal 102b. The same may be said of the other applications 404 and 406 when they are scheduled.

As mentioned, the operating system 400b may also have the power to suspend an application such as the VoIP client 402b or place it in some other background state whereby it is only allocated a very limited amount of processing resources per unit time.

In embodiments, the scheduling by the operating system 400b comprises the ability to place each application 402b, 404, 406 into either a foreground state or a background state.

A foreground state may comprise a state in which the foreground application is the main, dominant application being run at the current time. A particular example of this is the application being run in a full screen mode where it is allocated the whole screen resource at the expense of the other applications. For example a video game 406 may be given a full screen or other dominant foreground status when run, as the user may require the full screen to play the game and/or the game may consume significant processing resources such that limited or no processing resources can be made available for other applications such as the VoIP application 402b and the email client 404. This kind of scenario is particularly likely to occur on a mobile terminal such as a handheld mobile phone where resources are relatively limited compared to, say, a desktop computer.

Another instance of foreground state may comprise a state in which no one application has a dominant state relative to any other the applications, e.g. the user of the terminal 102b has an open desktop with no application maximised, and the VoIP application 402b is allowed sufficient processing resources by the operating system 400b for full operation, not being supressed in favour of any other application such as video game 406.

However, when one application such as video game 406 is in a dominant foreground state, one or more other applications 402b, 404 may be put into the background state by the operating system 400b. The VoIP client 402b may be a particular candidate for this. Alternatively or additionally, at other times the operating system 400b may put an application such as the VoIP client 402b into a background state in order to save battery resources.

In such background states, the VoIP client 402b is either suspended meaning it is not scheduled any processing cycles by the operating system 400b, or at best supressed so that it is scheduled only limited cycles compared to a non-supressed foreground state. In the suppressed state, the client 402b may only have very limited functionality where it may not be able to unilaterally handle incoming call invites or notifications, or may not be able to process call invites or notifications using full resources that would otherwise be available in a higher functionality state.

In a foreground state, the VoIP client 402b is fully able to listen for incoming invites or notifications, which it does by listening on a network socket 412 of the destination user terminal 102b. A network socket is a combination of a network address and transport layer port allocated for use by an application such as the VoIP client 402b, typically an IP socket being combination of IP address and port number. For example in a foreground state the VoIP client 402b may be able to receive conventional P2P call invites (CI) directly from the originating terminal 102a and process the invite accordingly in order to accept the call, and/or may be able to receive and process application layer push notifications (PN AL) from the VoIP provider 204. The destination client 402b may have a persistent connection open with the provider's network element 204 for this purpose.

In embodiments, in the background state the VoIP client 402b has no cycles scheduled and must rely on the operating system based push notification service 202, or has too limited cycles to rely on anything other than the operating system based push notification service. In this case, the operating system based push notification (OS_PN) is received by the operating system 400b which in response displays an on-screen prompt on the destination terminal 102b. The prompt notifies the callee that there is a communication event requesting attention, and prompting the user to select whether to exit the full screen mode or otherwise enable wake-up of one or more dormant applications. The format of the on-screen prompt may be dictated by the operating system 400*b*, optionally with a few parameters that may be specified in the push notification. In some embodiments the prompt may inform the user of no more than the fact that there is an unspecified communication event and asking whether to wake up the phone from a full screen or standby state generally. In other embodiments the prompt may include some additional information allowing the user to make an informed decision, e.g. an indication that the communication event is an incoming call, and/or user-viewable information concerning the identity of the caller (e.g. display name). Such additional information may be derived from the payload of the receive push notification.

Further, if the user accepts, a suitable API 410 between the operating system 400*b* and the VoIP client 402*b* may pass certain information derived from the push notification payload up to the awoken application 402*b*, so that the VoIP client 402*b* on the destination terminal 102*b* can formulate a response and return the response back to the originating terminal 102*a*. This payload information may comprise machine-readable identifier information such as a username identifying the caller within the communication system, and/or an address identifying the caller's terminal 102*a* within the network 100.

In alternative embodiments, there may exist a background state of the VoIP client 402*b* whereby it is scheduled limited cycles by the operating system 400*b*, but still enough cycles to at least listen for application layer push notifications on the socket 412, and to perform at least some processing on a received notification, even potentially so as to formulate the acceptance response and return it to the originating terminal before wake up (though wake up may still be needed to actually conduct the call, i.e. to handle the incoming and outgoing voice and/or video streams once they begin).

Using an operating system based push notification service, the notification is sent to the operating system 400*b* and at least initially processed by the operating system (even if the operating system 400*b* subsequently passes at least some of payload up to the application 402*b*). This is different from application layer notification where the operating system 400*b* schedules the application 402*b* at least some cycles, which are sufficient for it to listen for push notifications on the relevant socket and to perform at least some processing on the received notification without being reliant on any special push notification mechanism of the operating system 400*b*.

Figure 5:
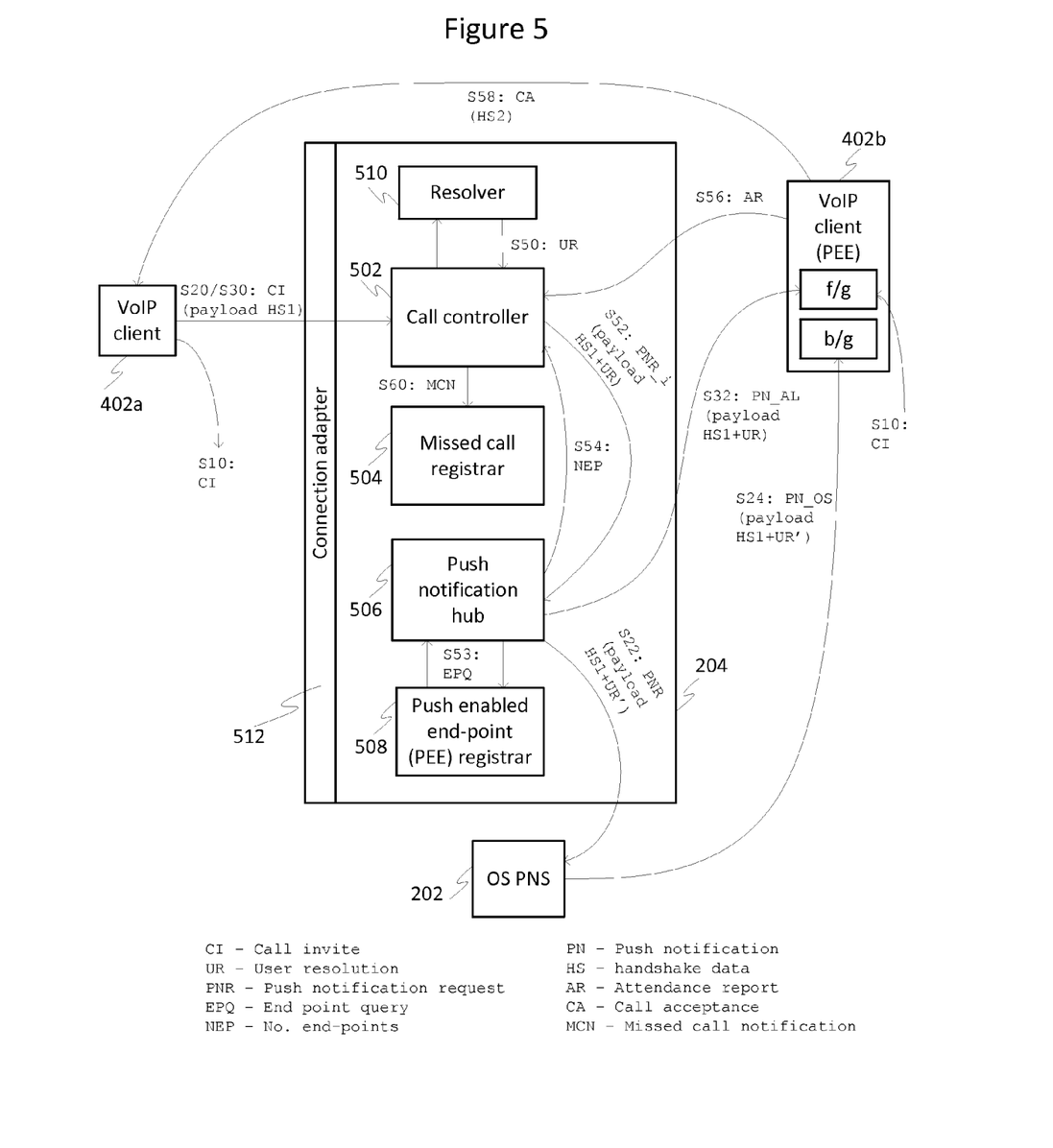
FIG. 5 is a schematic diagram of two user terminals and a network element.

FIG. 5 provides a schematic block diagram of the call control and notification element 204 of the VoIP provider in accordance with one example implementation of the present invention. The network element 204 comprises: a call controller 502, a missed call registrar 504 coupled to the call controller 502, a push notification hub 506 coupled to the call controller 502 and the operating system based push notification service (OS PNS) 202, a push-enabled endpoint (PEE) registrar 508, a resolver function 510 coupled to the call controller 510, and a connection adapter 512 for coupling the caller client 402*a* on the originating user terminal 102*a* to the call controller 502. Each of the elements 502, 504, 506, 508, 510, 512 may be implemented as modules of software stored on a memory of one or more server units of the VoIP provider 204 (in the form of a computer-readable storage memory or media such as a magnetic or electronic storage device) and arranged to run on the one or more server units of the VoIP provider 204. The one or more server units comprise processing apparatus arranged to execute the software and transceiver apparatus arranged to perform the relevant communications over the Internet 100 or other such packet-based network.

The destination user terminal 102*b* may be registered as a push-enabled endpoint (PEE), and the callee client 402*b* on the destination terminal 102*b* may be arranged to be able to receive one or more application layer push notifications (PN AL) from the push notification hub 506 via IP socket 412, and/or the operating system 400*b* may be arranged to be able to receive one or more operating system based push notifications (PN_OS) from the operating system based service 202. In the latter case, the callee client 402*b* on the destination terminal 102*b* may be arranged to be able to receive payload information from one or more of the operating system based push notifications (PN_OS) via the API 410.

In operation, the caller's VoIP client 402*a* on the originating terminal 102*a* begins by forming a connection with the call controller 502 via the Internet 100 and connection adapter 512. The connection may provide an identifiable connection, such that any communications received by the call controller 502 from the caller client 402*a* over a given connection with the connection adapter 512 are identified as originating from a particular known source. The connection adapter 512 may authenticate the identity of the caller, such that any communications received over the connection with the connection adapter 512 are identified as originating from a source whose identity is securely verified.

In embodiments the connection adapter 512 provides a frontend component which authenticates the client using a suitable authentication mechanism (which may be proprietary) and also terminates the client's connection. The connection adapter 512 may then serve as an authoritative source of client identity to the rest of the services and to call controller 502 in particular (see discussion later). In embodiments therefore, the identity of the caller need not be provided in the payload by the caller itself, which is advantageous because otherwise the identity could be forged and therefore would not be trusted.

At step S20 and/or step S30 (corresponding to those shown in FIGS. 2 and 3) the client 402*a* on the caller's user terminal 102*a* uses the connection via the connection adapter 512 to send a call invite (CI) to the call controller 502 of the VoIP provider 204.

In order to establish a session for conducting a communication such as a call it is necessary to exchange two messages of a handshake protocol, which form two halves of the handshake—a first from one endpoint to another and then the second handshake message in return, agreeing to the call. In embodiments the call invite sent from the caller client 402*a* comprises the first handshake message HS1.

In embodiments, HS1 may be a P2P session establishment message. In this case it contains enough information for the receiver of that message to be able to continue negotiation of a P2P transport session with the sender (such as may be used to conduct a call). It may contain one or more IP addresses through which the caller could be reached and potentially some other information. This message serves as an invitation to have a P2P session established. Once an authenticated and encrypted session is established, call signalling may flow over the session. Relay information and username are something separate from HS1 and those may be used in a fallback mechanism when HS1 is not available or expired while travelling. Note however that the various embodiments are not limited to a P2P or hybrid P2P arrangement, and in other embodiments some or all of the subsequent stages of session establishment may proceed via a centralized element such as one or more servers. Other types of session establishment protocols for establishing other types of session are also possible.

In response to receiving the call invite from the caller client 402a, the call controller 506 then formulates an internal push notification request PNR_i.

In embodiments, this involves at step S50 the call controller 502 referring to the resolver function 510 to resolve identifier information—the "user resolution" information (UR)—of the caller and/or his or her user terminal 102a. The resolver 510 maintains a list of user and/or user terminal related information, which the call controller 502 can query based on the identified connection with the connection adapter 512.

The user resolution (UR) may fall into at least two categories. The first is identifier information which will be used to allow the callee's client 402b to contact the caller in response. This may include:
 a username of the caller identifying the caller within the VoIP communication system; and/or
 an address of the caller's originating user terminal 102b identifying it within the network (typically IP address); and
 optionally additional routing information such as an identification of any one or more relays, e.g. 102c, to use to contact the caller.

The second category of UR information is information that allows the callee to make an informed decision about whether to answer the call. This may comprise:
 a display name of the caller (distinct from a user name
 an avatar image of the caller; and/or
 an indication of a language to use to notify the callee of the incoming call, which may extend to a language template specifying the syntax for the on-screen notification message as it will appear at the callee's terminal 102b.

In embodiments, the resolver 510 comprises a list of nationalities, residences and/or languages mapped against the identities of a plurality of users of the commination system in question. The resolver 510 is then configured to resolve the language or language template based on the identify of either the callee and/or the caller. An identity of the caller (e.g. username) may also have been included in the call invite (CI), and can be used for this purpose as well as identifying the destination. The selected language (and optionally language template) can be selected based on the nationality, language and/or residence of the callee (or more generally recipient) as this is the person the notification is intended to notify. However, if this is not available, a best guess may be that the callee or recipient understands the language of the caller (or more generally sender).

In some embodiments, the resolver 510 is configured to resolve the language or language template based on the identity of both the caller and callee, by determining a shared language of the two users.

In embodiments, the resolver function 510 may also comprise a permission check function which maintains a list of users the callee has blocked from contacting him or her. The permission check acts to block call invites from any caller found in this list, and the following steps for notifying the callee will only proceed on condition that the caller is not blocked.

Assuming this does not happen, the call controller 502 formulates a payload comprising the user resolution information, the HS1 message, and any other relevant information received in the call invite (CI) (see below). At step S52, the call controller 502 then forwards this payload to the push notification hub 506 in the internal push notification request PNR_i.

Additional information that may be included in the payload is as follows.
 A timestamp indicating a time at which the invitation was issued. This may be used to detect when the attempt to establish a call times out. For example, the time limit for time-out may be in the range 30-60 seconds, and in one embodiment is 50 seconds. The timestamp may be included in the call invite sent from the caller client 402a then forwarded in the payload, or generated by the call controller 502 if not already included from the invite received from the caller's client 402a.
 An encryption key of a key exchange scheme, being the caller's public key (so the callee can decrypt the caller's content). This may be included in the call invite sent from the caller client 402a then forwarded in the payload, or alternatively be stored at the resolver 512 and added by the call controller 502 as another instance of the user resolution information.
 An indication of a type of the originating endpoint 102a (e.g. is it a mobile phone, tablet, laptop or desktop, what operating system does it run, what version of VoIP client 402a does it run and/or what model is it). Again this may be included in the call invite sent from the caller client 402a then forwarded in the payload, or alternatively be stored at the resolver 512 and added by the call controller 502 as part of the resolution.
 A session identifier for the call, which may be added by the caller's client 402a or the call controller 502. Again this may be included in the call invite sent from the caller client 402a then forwarded in the payload, or alternatively be stored at the resolver 512 and added by the call controller 502.
 A conversation title and/or other conversation identifier for the call, being an indication of a logical topic or context of which the call is a part, e.g. if the call forms part of a wider conversation involving IM messages and/or previous calls. This is taken from the call invite from the caller's client 402a.
 If the notification system can be used for different types of communication (e.g. IM messages, voicemail and/or file transfers in addition to voice and video calls) the payload may also comprise an indication of the type of communication.

The push notification hub 506 receives the internal push notification request PNR_i. In response, at step S53 it queries the push-enabled endpoint (PEE) registrar 508 to check whether the callee has registered to receive push notifications. The PEE registrar 508 maintains a list of users who have registered to receive push notifications (or equivalently have not de-registered from receiving push notifications if receiving them is the default). For example this could be an option the user is presented with when he or she starts up a new phone 102b for the first time, or an option found in an options screen of his or her terminal 102b. Subsequently, when a call is attempted as in the illustrated scenario, the PEE registrar 508 acts so as to only permit the following push notification steps to proceed on condition that the callee has agreed that his or her device 102b will be able to receive push notifications (or equivalently has not opted out).

Assuming the callee is registered for push notifications, the push notification hub then does one or both of two things:
 sends an external push notification request PNR to the operating system based push notification service 202 (corresponding to step S22 of FIG. 2), in turn causing the OS based push notification service 202 to send an operating system based push notification (PN_OS) to the operating system 400*b* on the destination terminal 102*b* (corresponding to step S24 in FIG. 2); and/or formulates and sends an application layer push notification (PN_AL) directly to the callee's client 402*b* on the destination terminal 102*b* (corresponding to step S32 in FIG. 3).

In addition, at step S53 the push notification hub may send back a message (NEP) indicating the number of endpoints of the callee to the call controller 50 (the callee could have multiple devices registered with the PEE registrar 508). This may be used by the call controller to keep track of how many devices of the callee it might potentially expect an attendance report (AR) from (see step S56).

The push notification hub 506 acts to include at least some of the payload information received from the call controller 502 in the push notification (via the OS PNS 202 in the case of an OS based push notification PN_OS). In embodiments the amount of payload information may be selected by the push notification hub 506 in dependence on the type of push notification in which it is to be included, application layer or operating system based.

In the case of an application layer push notification formulated by the push notification hub 506, this may include any amount of the payload information up to and including the full amount discussed above, or more. This may comprise the first handshake message HS1 of the handshake protocol, and anything up to the full user resolution information (UR) comprising the caller's username, originating address, caller's display name, avatar image for the caller (or link to the avatar image) and language indicator or template. This payload information is provided to the callee client 402*b* in the application layer push notification PN_AL.

If the client 402*b* on the callee's terminal 102*b* receives the application layer push notification PN_AL, it extracts the payload information and uses this to notify the callee of the incoming call. This may comprise extracting a user readable portion of the user resolution information, such as the display name, avatar image (or link to an avatar image) and/or language template and using it to generate a suitable user notification in the form of an on-screen notification message. For example the on-screen message may show the avatar image and display a written message of the format "you have an incoming call from [display name]". Alternatively the user notification may take the form of an audible spoken message from a speaker of the destination terminal 10*b*.

The language of the user notification message (that is to say the written or spoken language, i.e. language bin the linguistic sense) is determined based on the indication received in the payload of the push notification. For example this could specify a language from amongst a group comprising two or more of English, French, German, Dutch, Spanish, Portuguese, Italian, Greek, Romanian, Hungarian, Bulgarian, Czech, Polish, Swedish, Finnish, Norwegian, Estonian, Latvian, Lithuanian, Ukrainian, Russian, Turkish, Arabic, Mandarin, Cantonese, Japanese, Vietnamese, Korean, Taiwanese, Thai, Hindi, Urdu, Bengali, Punjabi, Marathi, Telugu, Pashto, Javanese, Afrikaans, sign language, etc.

In embodiments of the invention, the form of the user notification message is determined based on the syntax defined by the language template received in the payload of the push notification. At least one function of the syntax is to specify a location in the sentence (or more generally where in a portion of text or speech) to include the display name. Other linguistic formatting information may also be included in the syntax, e.g. where to place the indication of the type of incoming communication event (call, voice call, video call, IM, voicemail, file transfer or the like).

For example in English the user notification could take the form "you have an incoming call from [display name] with the caller or sender's name at the end of the sentence, whereas in French for example it could take the form "[display name] vous téléphoner" with the caller or sender's name at the beginning of the sentence. The location at which the name is to be inserted in the string may be a function of the language selected by the resolver 510, and therefore the syntax corresponds to the language. The language and syntax (i.e. linguistic format) of are specified by the language template.

Further, assuming the callee answers the call, the client 402*b* on the callee's terminal 102*b* is configured to extract from the payload of the push notification session establishment information scuh as the handshake message HS1 and the part of the user resolution information for contacting the caller in response, and thereby to formulate a call acceptance response (CA) and signal the response back to the originating client 402*a* on the caller's terminal 102*a*. The call acceptance response accepts the establishment of a session with the intention of using the session to conduct the call. For example received HS1, the callee's client 402*b* formulates a call acceptance response CA comprising the answering half of the handshake protocol, the HS2 message. At step S58, the callee's client 402*b* then signals this acceptance response back to the client 402*a* on the originating terminal 102*a* based on the relevant user resolution information, comprising at least the username of the caller and/or the address of the caller's terminal 102*a*

By using the payload information, this is done without the need for any other signalling over the network 100 to retrieve identifier information for contacting the caller's terminal 102*a*, or to retrieve information to identify the caller to the callee and/or determine the format of the user notification before he or she decides whether to answer the call. An extra referral back to any provider or operator infrastructure such as elements 204 or 202 is not required for these purposes. Thus the number of roundtrips in the call signalling is reduced, meaning the time for call acceptance to be achieved may be reduced.

In embodiments the callee's client 402*b* may only receive the application layer push notification PN_AL if it is found in the foreground (f/g) state at the time of the notification, as in this state it has sufficient processing cycles scheduled to be able to listen on the IP socket 412 and process the application layer push notification PN_AL when detected. However, in certain implementations it is possible that the callee's client 402*b* could be allocated a special background state whereby, although it is scheduled a supressed amount of processing time, it still has sufficient cycles to be able to detect and act upon the application layer push notification PN_AL.

The callee's client 402*b* may also report back to the call controller 502 with an attendance report (AR) at step S56, indicating that it has accepted the call. The call controller 502 may use this to keep track of whether the call has been answered, or whether it times out before it is answered. Alternatively the attendance report (AR) may be sent by the originator when it receives a response from the destination. The latter option may be used in case the call is answered at the destination side by a legacy client that has not been upgraded with functionality to send attendance reports.

In the case of an operating system based push notification PN_OS generated via the service 202, this may include a reduced amount of payload information from amongst the potential payload information discussed above. For example this may comprise the handshake message HS1, and certain selected user resolution information (UR'), at least the username of the caller and/or the address of the caller's user terminal 102a. The language or language template could also still be used as payload information in an operating system based notification. This payload information is provided to operating system 400b on the destination terminal 102b in the operating system based push notification PN_OS.

If the operating system 400b on the callee's terminal 102b receives the operating system based push notification PN_OL, it generates an on-screen message to notify the callee of the incoming call. Optionally this may involve certain limited parameters extracted from the payload information being inserted into a predefined on-screen message format of the operating system 400b. For example the receiving operating system 400b may determine from the received payload the display name of the caller, and the fact that the appropriate language template is the English template "you have an incoming call from [display name]" or the French template "[display name] vous téléphoner". However, other aspects of the on-screen message format may be dictated by the operating system 400b, e.g. it's size, its "look and feel" and any associated graphics.

For example, if the callee was playing the video game 406 or using some other application in a full screen or otherwise dominant state at the time of the notification, the operating system may cause a small notification message to pop-up in a relatively unobtrusive location such as a corner of the screen.

The on-screen message generated by the callee's operating system 400b prompts the callee as to what action to take, e.g. whether to take the call, or whether to dismiss the notification and continue playing the game 406.

As discussed previously, the destination VoIP client 406b may be in a background (b/g) state at the time of the incoming notification. If in response to the operating system prompt the callee does choose to accept the call, the operating system wakes up the callee's VoIP client 402b. This may involve ending the full screen or other such dominant state of the application that was previously running in the foreground (e.g. game 406).

The operating system 400b on the callee's terminal 102b will also pass at least a certain amount of the payload information up to the newly restored VoIP client 402b, the first handshake message HS1 and at least some of the user resolution information for contacting the caller in response, i.e. the caller username and/or originating terminal address. When it awakes, the callee VoIP client 402b is thus able to formulate the call acceptance response CA including the return handshake message HS2 and address this response back to the originating client 402a on the caller's user terminal 102a The payload information received in the push notification is therefore still sufficient to formulate a call acceptance response (CA) without the need for any other signalling over the network 100 to retrieve identifier information for contacting the caller's terminal 102a, or to retrieve information to identify the caller to the callee before he or she decides whether to answer the call. Thus again, the number of roundtrips in and hence the time for call acceptance may be reduced.

Again the callee's client 402b may also report back to the call controller 502 with an attendance report (AR) at step S56, indicating that it has accepted the call. Alternatively the attendance report (AR) may be sent by the originator when it receives a response from the destination. The call controller 502 may use this to keep track of whether the call has been answered, or whether it times out before it is answered.

In some embodiments both the application layer based and operating system based push notification mechanisms exist in parallel. The push notification hub may attempt both notification methods in parallel.

Further, the caller client 402a on the originating user terminal 102a may still be operable to send conventional P2P call invites (CI, step S10) directly over the Internet 100 to the callee client 402b on the destination user terminal 102b.

In alternative embodiments HS1 may not be included in call invite (CI) from the callee (step S20/S30). Instead the exchange may require the callee to send HS1 to the caller in response to the initial notification and the caller to then reply with the second handshake message HS2, so as to establish a reverse session.

In embodiments, once the above call signalling has been performed, authentication of the users may proceed in a mutual fashion by exchanging certificates between callee and caller as in the conventional P2P manner. Alternatively or additionally, authentication could be performed centrally by the connection adapter, when it verifies the identity of the caller at the time of forming the initial connection. In the case where authentication is done after the above signalling by exchange of certificates, note that the call acceptance response CA is not the one absolute final criterion for successfully conducting the call, but is a provisional acceptance which establishes a session over which authentication may first proceed—the actual call is then subject to this authentication (which in most situations is unlikely to be a problem, as long the communication is not malicious). In other embodiments authentication could rely solely on the initial authentication of the caller by the connection adapter.

In certain embodiments, both stages of authentication may be used in the process of establishing the call. First, the caller client authenticates itself on the connection adapter 512 and then over established authenticated transport sends an invite to the call controller 502. This is the first authentication and it is used to authenticate client on the server 204. When the push notification containing HS1 arrives to the callee client ,this is the first step to establish an authenticated direct (P2P) connection between client and this is where second authentication happens. The first stage is a centralized authentication, whereas in contrast the second stage is P2P authentication.

In further embodiments, the notification features discussed above in relation to call invitations may alternatively or additionally be used to notify the user of the destination terminal about other communication events, for example an IM chat message, voicemail or file transfer which the sender (the user of the originating terminal 102a, analogous to the caller in the above) is attempting to send to the intended recipient (the user of the destination terminal 102b, analogous to the callee in the above). If the recipient accepts, their client 402b may either retrieve the waiting communication from a server (e.g. part of the element 204), or retrieve it directly from the sender's terminal 102a.

It will be appreciated that the above embodiments have been described only by way of example.

For instance, although the above has been described above in relation to a hybrid P2P system for performing VoIP calls, the techniques disclosed herein may be applicable to other types of packet-based communication systems. Therefore in alternative embodiments, after the notification, one, some or all further stages of the session establishment (such as may be used to conduct a call) may alternatively proceed via one or more network centralized elements such as one or more servers of one or more providers or operators. Note also in relation to embodiments where some P2P techniques are used, in its broadest sense the term P2P does not necessarily limit to a fully de-centralised arrangement. In some embodiments for example, only the media (i.e. the content of the call or other session) need be transmitted directly between peers, with all other call signalling (including address look-up and authentication) occurring via a central element.

Further, where any network element has been described above in terms of server, it will be appreciated this does not limit to a single server unit or servers housed in the same housing or located at the same site. Any logical network element implemented over any of one or more units may be used to implement the communication provider functions in accordance with embodiments of the present invention. Further, while the above has been described in terms of communications of the Internet, the various embodiments may also be used for providing notifications over other packet-based communication networks and/or to notify of communications over other packet-based communication networks.

Other variants may become apparent to a person skilled in the art given the disclosure herein.

The invention claimed is:

1. An apparatus comprising:
a processing apparatus configured to generate a push notification relating to a communication from an originating endpoint intended for a destination endpoint, the communication to be conducted over a packet-based network; and
a transceiver apparatus arranged to send the push notification to the destination endpoint;
wherein the processing apparatus is configured to generate the push notification with a payload comprising a language template comprising an indication of a language to be used by the destination endpoint to output a user notification notifying a destination user regarding the communication, the language template further comprising an additional indication of a corresponding linguistic syntax to use for the user notification, the linguistic syntax configured to modify a form of the user notification by specifying a position within the user notification to display a name associated with a user of the originating endpoint, and the linguistic syntax configured to cause the positioning of the name associated with the user to vary based on the corresponding language to be used by the destination endpoint.

2. The apparatus of claim 1, wherein said apparatus comprises a network element of a communication provider comprising said processing apparatus and transceiver apparatus;
wherein the transceiver apparatus is arranged to receive a request message from the originating endpoint; and
wherein the processing apparatus is configured to generate the push notification in response to the request message from the originating endpoint, at least said indication of the language or language template being determined and inserted into the payload of the push notification at said network element.

3. The apparatus of claim 2, wherein the request message comprises an invitation message from the originating endpoint inviting the destination endpoint to a proposed communication session over the packet-based network, the push notification relating to the proposed communication session, and the user notification notifying the destination user of the proposed communication session.

4. The apparatus of claim 3, wherein the proposed communication session comprises a voice or video call.

5. The apparatus of claim 2, wherein the processing apparatus is configured to select said language at the network element in dependence on an identity of the destination user.

6. The apparatus of claim 2, wherein the processing apparatus is configured to select said language at the network element in dependence on an identity of a user of the originating endpoint.

7. The apparatus of claim 2, wherein the processing apparatus is configured to select said language at the network element in dependence on both an identity of the destination user and an identity of a user of the originating endpoint.

8. The network element of claim 2, wherein the push notification comprises an operating system based push notification; and
the processing apparatus and transceiver apparatus of the network element are configured to send the operating system based push notification to the destination endpoint via a separate network element of an operating system based push notification service.

9. The apparatus of claim 1, wherein the payload comprises further information enabling the destination user to make an informed decision as to whether to accept the communication.

10. The apparatus of claim 9, wherein the further information indicates a type of the communication.

11. The apparatus of claim 10, wherein the type of the communication is indicated from amongst two or more of: a call, an IM chat message, a voicemail message, and a file transfer.

12. The apparatus of claim 9, wherein the further information comprises one or more of: the name associated with the user of the originating endpoint, a timestamp, a type of the originating endpoint, a session identifier for the communication, and a conversation identifier for the communication.

13. The network element of claim 1, wherein the destination endpoint comprises a client application which at times is found in a background state whereby it is suspended or scheduled a supressed number of processing cycles by an operating system of the destination endpoint, wherein the push notification initiates wake up of the client from the background state.

14. The network element of claim 1, wherein the push notification comprises an operating system based push notification.

15. The network element of claim 1, wherein the push notification comprises an application layer push notification.

16. A communication system comprising the network element and destination endpoint of claim 1;
wherein the destination user terminal is configured to output the user notification to the destination user based on the payload received in the push notification, in the language indicated in the payload, and to accept the communication to proceed over the packet-based network in dependence on a selection by the destination user in response to the user notification.

17. The apparatus of claim 1, wherein the linguistic syntax is configured to cause the name associated with the user to be placed at a beginning of the user notification for a first language and at an end of the user notification for a second language.

18. A computer program product comprising code embodied on a computer-readable storage memory and configured so as when executed on a destination endpoint to perform operations comprising:
receiving a push notification relating to a communication from an originating endpoint intended for the destination endpoint, the communication to be conducted over a packet-based network;
extracting from the push notification a payload comprising a language template comprising an indication of a language to be used by the destination endpoint to output a user notification notifying a destination user regarding the communication, the language template further comprising an additional indication of a corresponding linguistic syntax to use for the user notification, the linguistic syntax specifying a position within the user notification to display a name associated with a user of the originating endpoint;

based on the payload received in the push notification, outputting the user notification notifying the destination user regarding the communication, the user notification being output in the language indicated in the payload and the name associated with the user being positioned within the user notification based on the linguistic syntax; and accepting the communication to proceed over the packet-based network in dependence on a selection by the destination user in response to the user notification.

19. A method comprising:

generating a push notification relating to a communication from an originating endpoint intended for a destination endpoint, the communication to be conducted over a packet-based network;

generating a language template comprising an indication of a language to be used by a destination endpoint to output a user notification notifying a destination user regarding the communication, the language template further comprising an additional indication of a corresponding linguistic syntax to use for the user notification, the linguistic syntax configured to modify a form of the user notification by specifying a position within the user notification to display a name associated with a user of the originating endpoint;

inserting the language template into a payload of the push notification; and sending the push notification to the destination endpoint.

20. The method of claim 19, wherein the linguistic syntax is configured to cause the positioning of the name associated with the user to vary based on the corresponding language to be used by the destination endpoint.

* * * * *